No. 774,798.                                                     Patented November 15, 1904.

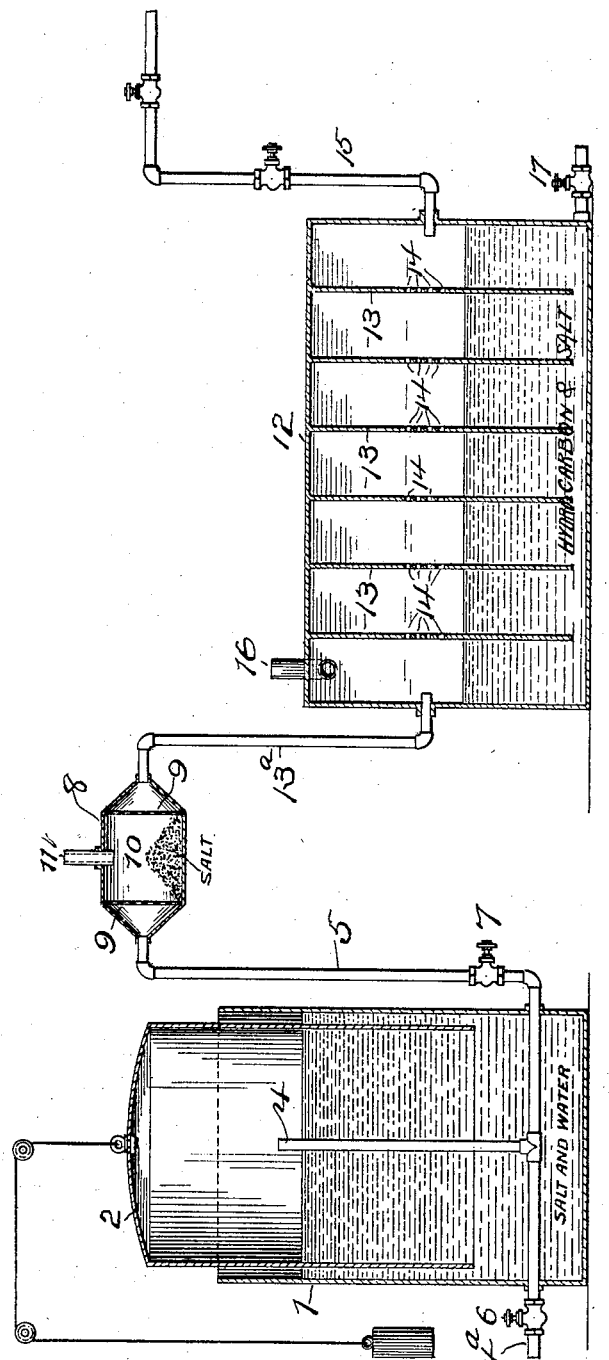

UNITED STATES PATENT OFFICE.

JESSE C. THOMPSON, OF BELKNAP, IOWA.

CARBURETER.

SPECIFICATION forming part of Letters Patent No. 774,798, dated November 15, 1904.

Application filed August 17, 1903. Serial No. 169,761. (No model.)

*To all whom it may concern:*

Be it known that I, JESSE C. THOMPSON, a resident of Belknap, in the county of Davis and State of Iowa, have invented certain new and useful Improvements in Carbureters; and I do hereby declare the following to be a full, clear, and exact description of the invention, such as will enable others skilled in the art to which it appertains to make and use the same.

My invention relates to an improved carbureter, the object of the invention being to provide improvements of this character which will cheaply produce a gas for heating and illuminating purposes, which can be easily operated and controlled, which will be comparatively simple in construction, and which will produce a gas having perfect combustible qualities.

With this object in view the invention consists in certain novel features of construction and combinations and arrangements of parts, as will be more fully hereinafter described, and pointed out in the claim.

The accompanying drawing is a view in vertical longitudinal section illustrating my improvements.

1 represents a tank containing salt water, into which the lower end of a bell 2 is submerged and provided with a counterbalance-weight 3, suspended upon a rope or cable supported on pulleys, as shown. A pipe 4 is mounted vertically in tank 1, projects up above the water-level therein, and is connected at its lower end with an inlet-pipe 4ª and an outlet-pipe 5, provided with valves 6 and 7, respectively, to govern the inlet of air and outlet of air. The outlet-pipe 5 discharges into one end of a tank 8, which I term the "air-mixer." This tank is divided by vertical wire screen or netting partitions 9 into a salt-containing chamber 10, through which the moisture-laden air from pipe 5 must pass. A valved air-inlet 11 is provided in said tank 8, through which air may be admitted to make the mixture desired.

The outlet end of air-mixer 8 is connected with one end of a carbureter-tank 12 by a pipe 13ª. The tank 12 contains hydrocarbon liquid up to the desired level and salt. Vertical partitions 13 are located in tank 12, extending from the top down to near the bottom thereof and made with perforations 14 above the liquid-level, through which the air passes and is interrupted by the partitions. A valved gas-outlet pipe 15 communicates with the end of tank 12 to convey the gas to any desired point for combustion or storage. A hydrocarbon and salt inlet 16 is provided in the top of the tank and a drain-faucet 17 is located near the bottom of said tank.

The operation of my improvements is as follows: Valve 6 being open and valve 7 closed, air is forced through pipe 4 into the bell 2. The air accumulates in the bell above the salt water therein and raises the bell. When a sufficient quantity of air collects in the bell, valve 6 is closed and valve 7 opened. The moisture-laden air will then pass through pipe 5 to the mixer 8. The salt in this chamber will absorb moisture from the air entering the chamber by the pipe 5 and fresh air will enter by the pipe 11. The mixed air will flow from chamber 8 and will pass into carbureter-tank 12, and in its obstructed passage through tank 12 will be thoroughly impregnated with hydrocarbon vapor and escape therefrom a perfect gas for illuminating or heating.

A great many slight changes might be made in the general form and arrangement of the parts described without departing from my invention. Hence I do not restrict myself to the precise details set forth, but consider myself at liberty to make such changes and alterations as fairly fall within the spirit and scope of my invention.

Having fully described my invention, what I claim as new, and desire to secure by Letters Patent, is—

Carbureting apparatus comprising a hydrocarbon-receptacle, a series of parallel partitions dividing said receptacle into a series of chambers, said partitions extending from the top of the receptacle to points above the bottom thereof whereby hydrocarbon oil in the several compartments will be maintained at a common level, said partitions having unobstructed perforations above the oil-level for the passage of air from one compartment to another and over the hydrocarbon oil therein, an air-drier communicating with one end compartment, an outlet for carbureted air communicating with the other end compartment of the hydrocarbon-receptacle and means
5 for passing air through said drier and hydrocarbon-receptacle.

In testimony whereof I have signed this specification in the presence of two subscribing witnesses.

JESSE C. THOMPSON.

Witnesses:
JAMES J. SMITH,
FRANK P. HOPRAUN.